United States Patent [19]

Barthel et al.

[11] Patent Number: 4,495,597
[45] Date of Patent: Jan. 22, 1985

[54] MICROPROCESSOR-CONTROLLED ADAPTER CIRCUIT FOR REAL-TIME CONTROLS, IN PARTICULAR FOR PRINT HAMMER CONTROLS

[75] Inventors: Jan Barthel, Holzgerlingen; Hermann R. Bublitz, Boeblingen, both of Fed. Rep. of Germany

[73] Assignee: International Business Machines Corporation, Armonk, N.Y.

[21] Appl. No.: 403,687

[22] Filed: Aug. 2, 1982

[30] Foreign Application Priority Data

Aug. 6, 1981 [EP] European Pat. Off. ........ 81106153.0

[51] Int. Cl.³ .............................................. G06F 3/12
[52] U.S. Cl. .................................................. 364/900
[58] Field of Search ... 364/200 MS File, 900 MS File

[56] References Cited

U.S. PATENT DOCUMENTS 3,921,517 11/1975 Barcomb et al. ................. 101/93.09
4,048,625 9/1977 Harris, Jr. et al. ................. 364/900
4,071,887 1/1978 Daly et al. .......................... 364/200

Primary Examiner—Raulfe B. Zache
Attorney, Agent, or Firm—John S. Gasper

[57] ABSTRACT

Microprocessor-controlled adapter circuit for real-time controls, in particular for print hammer controls in line printers with revolving type carrier with two asynchronously driven FIFO buffers (FIRST IN, FIRST OUT). The first FIFO buffer contains time values (e.g., firing times for the print hammers) and the second FIFO buffer control information associated with these time values (e.g., print hammer address, control commands for the print hammer). By a request circuit (e.g., counters), the time values are successively read from the first FIFO buffer and fed to a gate circuit for switching the control information, associated with these time values, from the second FIFO buffer for controlling the output values.

A method of determining the firing times of the print hammers uses a reduced table in which for each character in each print position the positions (time values), in which the character is to be printed, are stored only for some displacement values of the revolving type carrier relative to the printer frame. For the remaining displacement values, the time values for character printing can be determined by division, using the table data.

Mechanical or electrical tolerances influencing the firing times of the print hammers are compensated for by accommodating in the table additional correction delay values for the print hammers, thus eliminating adjustments.

11 Claims, 7 Drawing Figures

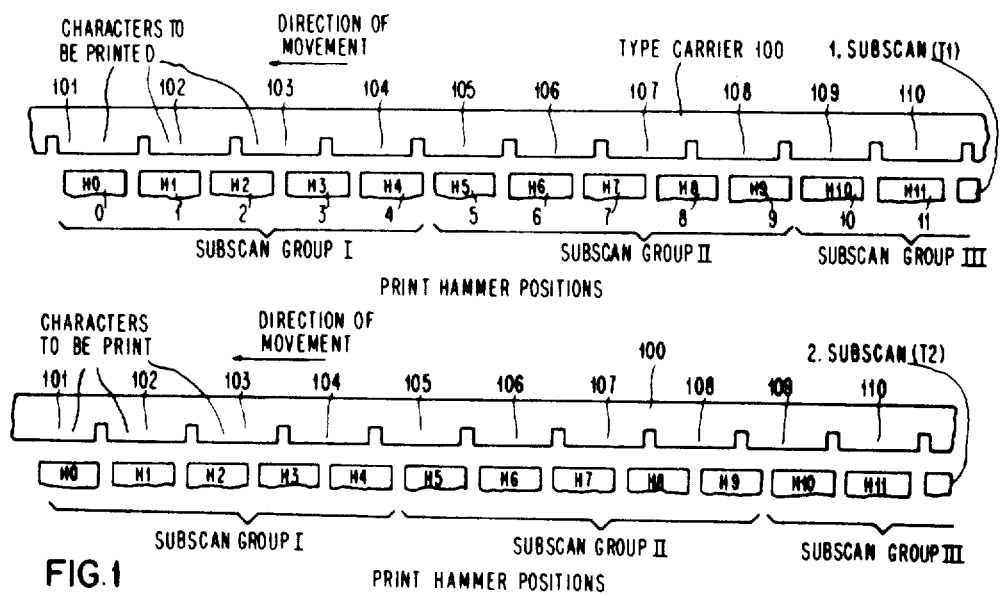
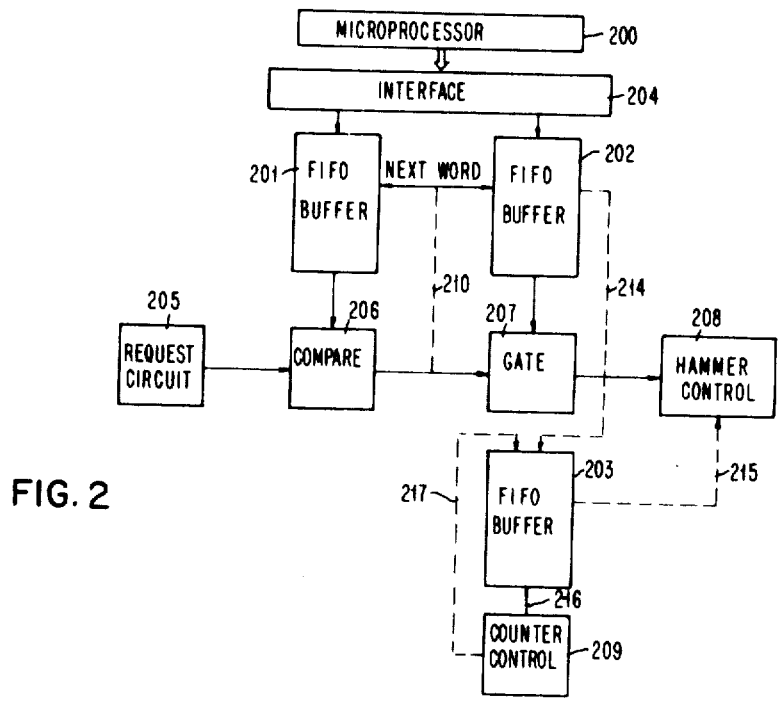
FIG. 1
FIG. 2

FIG. 3
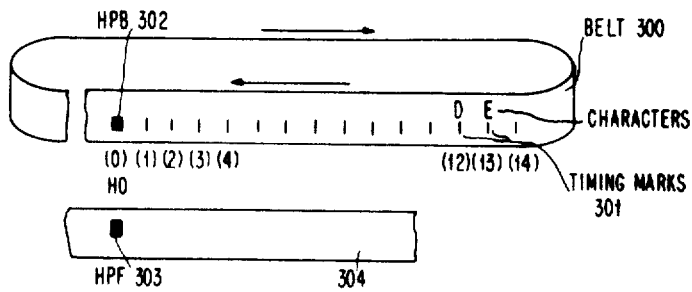
FIG. 4
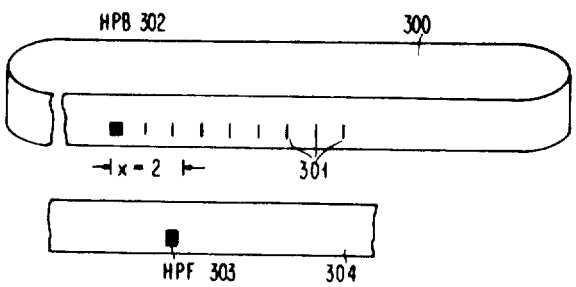
FIG. 5
![](x →)  ( 0   1  (2)   3   4 ··· 13   14 ··· 56   57   58 ··· 80 )
E | 13  13  (13)  13  13 ··· 13   57 ··· 57   57   13 ··· 13 |
TABLE ENTRY FOR CHARACTER "E"
FOR PRINT POSITION AT HAMMER 0
FIG. 6
REDUCTION FACTOR 8
x →  ( 0    8   16   24    56   64   72   80 )
     | 13  13   57  ···    57   13   13   13 |   TABLE ENTRY FOR "E"
     ( 0    1    2    3 ···  7    8    9   10 )   PRINT POSITION AT H0
       ↑
     NEW INDEX

MICROPROCESSOR-CONTROLLED ADAPTER CIRCUIT FOR REAL-TIME CONTROLS, IN PARTICULAR FOR PRINT HAMMER CONTROLS

The invention concerns a microprocessor-controlled adapter circuit for real-time controls, in particular for print hammer controls.

In high-speed printers with revolving type carriers—such as chains or belts—and print actuators, e.g., print hammers, associated with individual print positions, it is necessary for a line-by-line information output to determine the print times of the individual print hammers. This is done as a function of the characters to be printed in the individual positions.

It is expedient for such print controls to have a print hammer pitch which is slightly smaller than the pitch of the characters on the revolving type carrier. The reason for this slight difference in pitches is that prior to print hammer actuation, electronic comparisons are made which, although not being lengthy, require some time. From the time standpoint, print controls of this kind are subdivided into particular time sequences.

A principle of such a sequence is shown in FIG. 1. The print hammer positions are designated as 0 to 11 and the appertaining print hammers as H0 to H11. Each print hammer position corresponds to a print position on the assumed record carrier (not shown). For printing a character, a print hammer is actuated in the direction of the type carrier, causing the character immediately facing the print hammer to be printed on a record carrier. The characters are arranged on a type carrier 100 revolving in the arrow-marked direction. The pitch of the print hammers is smaller than that of the characters on the type carrier 100. In other words, in the illustrated embodiment according to FIG. 1, each group comprises five adjacent print hammers, e.g., H0 to H4, four adjacent characters 101 to 104.

Thus, at the time shown in FIG. 1, print hammers H0, H5, H10, etc., are faced by the characters 101, 105, 109, etc., so that the print positions 0, 5, 10, etc., could be printed. The print hammer groups in which at a particular time any one of their print hammers is faced by a character to be printed are subsequently referred to as subscan groups. In the example described, the subscan group I comprises the print hammers H0 to H4 and the subscan group II th print hammers H5 to H9, etc. The position of the type carrier 100, moving in the arrow-marked direction, with respect to the print hammers at the time T1 is referred to as the first subscan. At the time T2 the type carrier 100 has moved relative to the print hammers so that the print hammers H1, H6, etc., are faced by the characters 102, 106, etc., for printing. This position at the time T2 is referred to as the second subscan.

In this manner, the time sequence in which information is printed may be subdivided into a sequence of different subscans, wherein during a subscan one character in each subscan group can be printed.

For printing the information of a line, it is necessary, according to the position of the characters of the type carrier relative to the print hammers, to energize the hammers whenever they are faced by the desired character. It is obvious that such a time control is complicated. The basis of such a time control is the stored information to be printed.

For this purpose it is determined which character is to be printed in which print positions. In addition, a computer-controlled storage contains an electronic image of the characters arranged on the revolving type carrier, so that it is possible to tell at any time at which print position a particular character is available for printing. Such information is, of course, based on printer-specific pitches of the hammers and the characters on the type carrier. The respective subscan group in which a desired character can be printed in a particular print position during a particular subscan is determined by electronic comparisons.

Printers operating with the above-described time controls have been known for some time. In this connection attention is drawn, for example, to the chain printers IBM 1403, IBM 3203 and the steel belt printers IBM 3262.

Of the plurality of existing patent applications, which are based on the above-described print hammer control, the following is mentioned:

OS No. 2 057 675

Also known are so-called adapter circuits, whose purpose it is to bridge interfaces between different circuits. Such interfaces may be problematical, for example, if different data transfer rates are to be observed in the units to be lined with each other. Such interface circuits for data processing systems are described, for example, in the following German patent applications:

OS No. 2 719 253—This application concerns an interface circuit made up of a microprocessor with its own storage, wherein an instruction decoder is connected to the output of an instruction register and has its output connected to the input of a connecting circuit for generating at least three instruction signals.

OS No. 2 828 731—In this application a channel storage adapter is described which in a data processor serves as an adapter between an input/output processor and access means for the jointly used main storage.

OS No. 1 916 979—This Offenlegungsschrift describes a circuit arrangement for controlling the data flow between a data processor and data storages and input-/output units, respectively, with relatively slow access or cycle times.

OS No. 2 417 446—This Offenlegungsschrift concerns an adapter for connecting automatic data processors and peripheral units which are linked with a microprocessor-controlled unit. The adapter is arranged between a channel and the microinstruction-controlled unit. It comprises logic circuits sensing and emitting signals on a line, so that the microinstruction-controlled unit is not interrupted. As a result, data arriving on a line are prevented from reaching the microinstruction-controlled unit while channel requests are handled by control signals present on particular lines.

In the case of print hammer controls (for belt or chain printers), two different operating principles are known. The ripple print principle prevents print hammers in different subscan groups from being simultaneously fired during a subscan. Thus, this ripple print principle (the term being derived from Anglo-Saxon) usage) might also be described as a print method for serial hammer actuation. It is to counteract increased energy requirements of the printer at a particular point in time. In accordance with the ripple print principle, the hammer pitch is additionally increased, i.e., an additional spacing is provided for the hammers printing simultaneously in the different subscan groups.

The gang firing principle on the other hand permits the hammers of several subscan groups to be simultaneously fired during a subscan. The energy requirements of this principle exceed, of course, those of the ripple print principle.

The term gang firing is also derived from Anglo-Saxon usage; it might be described as a print method wherein several hammers are simultaneously fired at a particular time.

Hitherto, elaborate circuits have been necessary for the electronic comparisons used for print hammer control. Such circuits are rather limited in their application, as they are designed for a particular type of printer. An adaptation to new print speeds, other character or print hammer pitches is only possible by changing the circuits.

Therefore, it is the object of the invention to provide a microprocessor-controlled adapter circuit for control processes whose time sequence can be calculated in advance. Such control circuits can be used to particular advantage for print hammer controls.

This object of the invention is advantageously accomplished by the measures characterized in claims 1 and 4.

Favorable further developments of the invention may be seen from the subclaims.

The invention will be described below with reference to drawings in which

FIG. 1 is a schematic of print hammers and a type carrier passing same at different times for defining the terms subscan and subscan groups;

FIG. 2 is a block diagram of a microprocessor-controlled adapter circuit;

FIG. 3 is a diagrammatic representation of a revolving type belt with timing marks relative to a fixed sensor on the printer frame;

FIG. 4 is a schematic of a reference mark on the type belt relative to the sensor on the printer frame;

FIG. 5 is a schematic of a table entry for the character "E" for the print position 0 of hammer H0, taking into account different distance values between a reference mark on the type belt and the sensor on the printer frame;

FIG. 6 is a diagrammatic representation of a table entry for the character "E" for the print position 0 of the hammer H0, taking into account a divisor and a new index I at different distance values between the reference mark on the type belt and the sensor;

Figure 7:
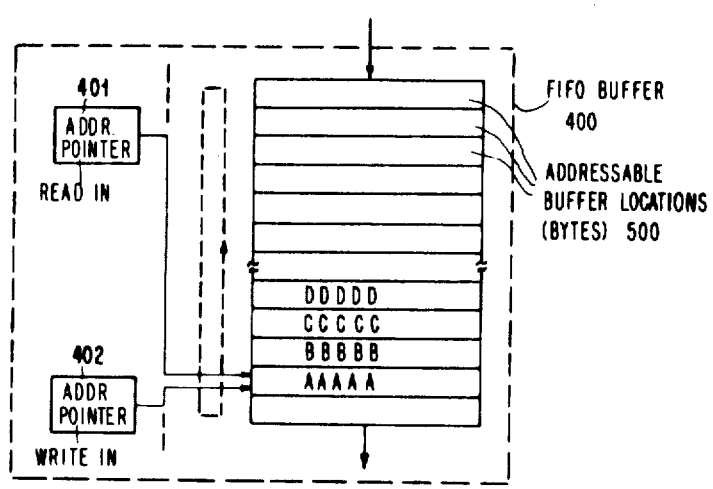
FIG. 7 is a diagrammatic representation of a so-called FIFO buffer.

The terms "subscan" and "subscan group" have already been described in connection with FIG. 1, taking into account the hammer and character pitches on the revolving type carrier. Although in the chosen example a subscan group comprises five hammers and the full width of the group is faced by four characters on the type carrier, this proportion may be different, if required.

FIG. 2 is the block diagram of a microprocessor-controlled adapter circuit. This adapter circuit is a control circuit of the usual "open loop" type (control circuit in the sense of an open loop system) according to Anglo-Saxon usage. This adapter circuit can ne used for control purposes, whose time sequence is calculated in advance by a microprocessor. Such circuits are particularly favorable for print hammer controls.

It is expressly pointed out, however, that such an adapter circuit is also suitable for control processes of other technical equipment and devices, such as process controls.

The adapter circuit shown in FIG. 2 will be described below with reference to print hammer controls.

The adapter circuit basically serves to adapt a relatively slow microprocessor to relatively fast printers. It is particularly suited for universal use in arbitrary line printers with different print hammer or character pitches. Such universal use is based on appropriate programming reflecting the peculiarities of the different principles which serve to determine the print times. The use of appropriate control programs does away with the printer-specific hardware control circuits previously used.

The adapter circuit shown in FIG. 2 must have a buffer function, taking into account the actual print times and print pauses. The microprocessor must be designed for the average value of the two previously mentioned factors (print times and print pauses). This renders the microprocessor adaptable to fast printers. If the microprocessor were designed only for the high speeds of the printer, without considering print pauses occurring, this would necessitate an elaborate microprocessor and thus increase costs. Essential component parts of the adapter circuit are two so-called FIFO buffers 201 and 202 (FIFO=FIRST IN/FIRST OUT) which are operated asynchronously. Buffers of this kind permit data input at any time (taking into account the system cycle) and a data output in the order of the two entries, which may also be effected at any time. Such FIFO buffers are generally known and commercially available (e.g., as MM67401 by MONOLITHIC MEMORY).

Such FIFO buffers may operate according to different principles. One of these principles is diagrammatically represented in FIG. 7. The buffer 400 consists of a number of addressable buffer locations, e.g., bytes. For writing information into the bytes, an address pointer 401 is provided, whereas an address pointer 402 is used to read information from these bytes.

These address pointers are address registers for controlling the access to particular buffer locations. The address control of such a FIFO buffer is effected in such a manner that information is written into successive buffer locations, e.g., in the arrow-marked direction, and that information from these buffer locations is read also in the arrow-marked direction. Suitable address control ensures that after each write or read instruction the byte address of the address pointer is changed by 1 in the arrow-marked direction, and that only information previously written can be read. When information is first written into the FIFO buffers, the addresses in pointers 1 and 2 are the same. Such a write process may be followed by a fresh write process at an address changed by 1 or information may be read from the unchanged address. Arbitrary read processes may immediately follow each other, and write or read processes may either alternate or succeed each other at irregular intervals. Information is read from or written into the FIFO buffer as a function of its cycle. During a cycle c, information can be selectively written during a first cycle half c1h and be read during a second cycle half c2h. Writing and reading are asynchronous, because it is possible to selectively write or read during a buffer cycle. Suitable address control ensures that the information which was the first to be written is also the first to be read (first in/first out). A fresh read instruction would cause information to be written into the address incremented by 1 of the first previously described buffer location. This applies in analogy to the third, fourth, fifth, etc. write instruction. Irrespective of the times at which information is written into successive buffer locations, the read instructions refer to the same order of buffer locations into which information was previously written.

Other FIFO buffers may be organized in such a manner that entered or written information, similar to a shift register, is shifted to a buffer location not yet occupied. In this manner the written information is kept available for reading at successive addresses. Reading is effected in the same order in which the information was written, i.e., for example, the information written into the fifth location can be read by means of the fifth read instruction. The FIFO buffers 201 and 202 shown in FIG. 2 receive their entry data from the microprocessor 200 through an interface circuit 204. The data output from a microprocessor is generally known and does not form part of the subject-matter of the invention, so that a detailed description of it has been omitted. The interface circuit 204 between the microprocessor 200 and the two FIFO buffers 201 and 202 is necessary for adapting the different interface characteristics to each other.

The data supplied by the microprocessor 200 contain for the FIFO buffer 201 the time values at which particular print hammers are to be fired. The FIFO buffer 202, on the other hand, receives control information concerning particular hammer addresses, such as hammer set or reset pulses, or echo requests for signals confirming that a hammer has been fired.

Control information is read from the FIFO buffer 202 as follows. By means of a request circuit 205, which may be formed, for example, by a counter, and by means of a compare circuit 206, connected to the request circuit 205 and the FIFO buffer 201, a gate circuit following the FIFO buffer 202 is activated after a particular time has elapsed, for example, after a particular count has been reached which corresponds to the next time value to be read from the FIFO buffer 201. The control information corresponding to the time value from the FIFO buffer 201 is subsequently read from the FIFO buffer 202 and fed to the hammer control circuit 208 through the gate circuit 207. The compare circuit 206 may be realized in a conventional manner, preferably in the form of an exclusive-OR circuit, whereas the gate circuit 207 can easily be formed by a simple AND gate.

The hammer control circuit 208 has a conventional design, such as those used, for example, in IBM printers 3203, 3262. Its function is to control the relevant print hammers at predetermined times in response to control data, such as hammer address, echo request, hammer set or hammer reset.

The previously described circuit part according to FIG. 2 may be advantageously extended, for example, by a third FIFO buffer 203 connected to the FIFO buffer 202. The FIFO buffer 203 may be used to reset individual print hammers. For this function the FIFO buffer 201 is connected to the FIFO buffer 203 by a line 214. The counter control 209 has connecting lines 216 and 217 linking up with the FIFO buffer 203, whose output 215 is connected to the hammer control 208. The introduction of the third FIFO buffer 203 relieves the time pressure on the second FIFO buffer 202. Where (without the third FIFO buffer 203) the control information for setting and resetting was previously derived from the second FIFO buffer 202, the reset request of the print hammers is now associated with the third FIFO buffer 203. For this purpose, the second FIFO buffer 202, for example, informs the third FIFO buffer 203 by line 214 when the hammers are set. This information is suitably delayed by means of the counter control 209, and the delayed information is used to reset the addressed hammers by line 215. As the time delay of the information entered into the FIFO buffer 203 by means of a count process is obvious to those skilled in the art, it need not be explained any further.

The time pressure on the FIFO buffer 202 is relieved in that this buffer does no longer have to emit the control values for resetting the hammers but that these values are derived by means of time delays from the set values of the print hammers, using the FIFO buffer 203.

FIG. 3 is a diagrammatic representation of a revolving type belt. Such a type belt 300 may be a steel belt with raised etched characters, as is known from standard steel belt printers, such as IBM 3262. The steel belt has a track with the characters to be printed and a track with timing marks 301. Each character is associated with a timing mark. These marks are electronically or magnetically sensed (by sensor HPF 303) for generating signals, by means of which the print time of the character associated with the timing mark is determined.

The direction of movement of the revolving type belt 300 is marked by arrows. The type belt 300 has a special mark HPB 302 in place of a timing mark, so that the position of the revolving type belt relative to the fixed printer frame 304 is known at any time. This mark HPB 302 will subsequently be referred to as start position mark. By means of this mark, the start of count processes for the printer control is determined with respect to the timing marks.

The mark HPB 302 can be electronically distinguished from the timing marks. In addition to determining the start position, it serves as a usual timing mark, i.e., also in this case a character is associated with it.

As the marks HPB 302 and the timing marks 301 move along, the sensor HPF 303 generates signals which are used for count processes, starting with the HPB signal.

FIG. 4 shows the type belt 300 at a time at which it has passed the sensor HPF 303 by two timing marks.

This relative displacement between HPDB and HPF is designated as x=2.

The possible displacement values are subsequently referred to as x. These displacement values are essential for the print hammer control described below.

The timing marks associated with the individual characters on the type belt 300 are designated as (0), (1), (2), (3), etc. Character "E" which is subsequently repeatedly quoted as an example is in the 13th position (13).

It has already been mentioned that before information is printed it must be known which character is to be printed in which print position.

It has also been mentioned that the print hammer control must have an electronic image indicating which character of the type carrier is at which print position at any particular time.

Assuming the character "E", for example, is to be printed in print position 0 of hammer H0, this can be done only at particular times which may be derived from the tables of FIG. 5 or 6.

For simplicity's sake, it is assumed that the print position 0 of hammer H0 is at the location of HPF 303.

If during the sequence control the character "E" is to be printed in position 0 of hammer H0, the system must access that part of the table which concerns the character "E" and the print position 0 of hammer H0. (This part of the table is shown in FIGS. 5 or 6.) Depending upon the current relative position of the marks HBP and HPF, it is possible to derive from this table a value at which the desired character "E" can be printed in the desired print position H0. It has already been mentioned that the value x as a displacement value is a count and thus a time value originating from the count of timing marks. The relevant count process starts upon the occurrence of a signal derived from the HPB mark. During this count process, a counter is incremented in response to the timing mark signals generated by the sensor HPF 303. The table entries in FIGS. 5 or 6 indicate at which counts x the character "E" can be printed in the desired print position of hammer H0. These counts are shown in the bordered part of the table. Each of these values in an ascending order is associated with an x value also in an ascending order (beginning at 0, continuing with 1, 2, 3, 4, etc., and ending with 80). These x values have already been defined as displacement values between HPB and HPF. In this example, the value x=80 corresponds to character numbers 0 to 80 on the character belt.

The table consists of a plurality of sections according to FIGS. 5 or 6. For each character in each print position corresponding table entries are required.

According to FIG. 5, the character "E" for the following counts (counted are the timing marks 301) can be printed in the print position H0: 13 and 57. For this purpose it is assumed that the character "E" exists twice on the type belt 300, namely, in the (13th) and the (57th) position. If the displacement is x=0, the character "E" can only be printed in the (13th) position of the type belt at a later time when the count of the timing marks 301 (starting at HBP 302) yields the value 13. This applies in analogy to the displacement value x=1. In this case, too, the letter "E" can only be printed if the count for the timing marks 301 is 13. In other words, the type belt 300 must have since moved so that the character "E" (to H0) appears in the HPF position. This applies in analogy to the displacement value x=2 to x=13. If the displacement between HPB and HPF exceeds x=13, a renewed printing of the character "E" is only possible at a timing mark count of 57. The reason for this is that, as previously mentioned, the character "E" exists a second time on the type belt, namely, in the (57th) position. Thus, the character "E" for the displacement values x=14 to 57 can only be printed in the print position of hammer H0 after the count 57 has been reached. In the case of a further displacement between HPB and HPF of x=58 to 80, the character "E" can again be printed in the print position of hammer H0 after the count 13 has been reached during a renewed count cycle (starting at HPB 302). Such a counter cycle covers a full revolution of the belt.

The table entries according to FIG. 5 can be reduced by repeatedly occurring table entries, such as the values 13 or 57, being grouped together. Proceeding from a new index IO to 10 to be defined (the assumed values being indicated in the bottom line in FIG. 6), assumed displacement values x (top line in FIG. 6) are associated with this new index I. The actual table entries in FIG. 6 for the character "E" for the print position of hammer H0 are shown in the bordered part and are 13 13 57 . . . 57 13 13. If the appertaining table value for an x value, which is between the specified x values 0, 8, 16, 24, etc., is to be looked up, the given x value is first divided by a given divisor in this case 8).

This divisor must be such that the division result yields the same table values as those shown in FIG. 5. The division result is rounded off, and the appertaining value in the table is read out.

EXAMPLE x=9

9 : 8 = 1.1 rounded off = 1, thus yielding the value for the new index I=1.

For I=1, the value 13 is derived from the table. By comparison with the data in FIG. 5 it will be found that the table value to be considered for x=9 is 13. Rounding errors occurring during division are corrected by subsequently comparing the table value (in this example 13) with the displacement value (x=9). If the displacement value exceeds the table value, the table value with the next new index (I+1) is used for further calculation. (Example: displacement value x=15→I=2→table value 13→(15>13)→I+1→table value 57).

The above description concerns hammer 0.

Calculations for the hammers 0 are effected as follows:

1. A value ΔH is deducted from the current displacement value of the print belt before the above-mentioned calculations. ΔH is the time, designated as displacement value, which a character requires from the respective hammer to hammer 0 (reference point). The constants ΔH for all hammers are contained in a table.
2. ΔH is added to the resultant table value.

In addition to saving storage space, the reduced table has the advantage of permitting faster access than unreduced tables.

By means of such table entries it can be readily predicted at what times (according to the counts of the timing marks) particular characters may be represented in particular print positions. It is obvious that this information has to be made available in a relatively short time. By using a microprocessor in conjunction with the described adapter circuit described, those time values are supplied (FIFO buffer 201) at which particular hammers are to be controlled. The permanent association of the timing marks and the characters on the type belt ensures that the characters are printed in their respective positions, the print process being controlled by the timing mark signal.

With the gang firing principle, several hammers can be simultaneously fired during a subscan. This means that a time value (from FIFO buffer 201) is associated with several hammer addresses.

The sequence control according to the ripple print principle has some peculiarities. To prevent several hammers from being simultaneously fired, there are additional hammer or character pitch differences on the type carrier. Compared to the gang firing principle, this leads to delays in connection with the gang firing principle, observing the following supplementary data:

A table is to be provided in which the delay values for the individual hammers are stored. With respect to the delay values, this table is sorted as control data in an ascending order. The calculations of the firing times for each hammer are affected in the sort sequence of the table (rather than in an arbitrary sequence as for the gang firing principle). A table for the firing times for each subscan (in an ascending order) is prepared, taking into account the delay values to be associated with the hammers.

Additional sorting for calculating an ascending sequence of delay values from an assumed ascending hammer sequence (each hammer is associated with a delay value) is eliminated. Mechanical or electrical tolerances affecting the firing times are compensated for by correction delay values in the table.

This eliminates elaborate mechanical flight time adjustments. Flight time variations occurring are merely measured and are subsequently considered by the program as described.

We claim:

1. A microprocessor-controlled adapter circuit for real time controls of output values, characterized in that two asynchronously driven FIFO buffers (FIFO=FIRST IN, FIRST OUT) are provided, one of which can be loaded with time values from the microprocessor, at which a control process is to be effected, and the other one of which can be loaded from the microprocessor with control information associated with these time values (such as address of an element to be controlled, type of control process), and that a request circuit is provided, by means of which the time values are successively read from the first FIFO buffer and are fed to a gate circuit for switching the control information associated with these time values from the second FIFO buffer for controlling the output values.

2. The arrangement according to claim 1, characterized in that the second FIFO buffer is connected to a third FIFO buffer for accommodating control information which, under counter control and as a function of the control information of the second FIFO buffer, is read for controlling the output values.

3. The arrangement according to claim 1, characterized by its use for line printers with a revolving character carrier and with print hammers associated with the individual print positions, the first FIFO buffer being loaded with the values for the firing times of the print hammers, and the second FIFO buffer being loaded with the control information associated with the firing times, such as print hammer address, and instructions for the control of the print hammers.

4. The arrangement according to claim 3, characterized in that the second buffer is connected to a third FIFO buffer for accommodating control information which under counter control and as a function of the control information of the second FIFO, is read for controlling the output values, and that the second FIFO buffer stores the control information for setting and the third FIFO buffer the control information for resetting the print hammers.

5. The arrangement according to claim 3, characterized in that the instructions in the second FIFO buffer for the control of the print hammers includes control information for setting the print hammers.

6. The arrangement according to any one of the claims 1 or 3, characterized in that the request circuit is a counter.

7. The arrangement according to any one of the claims 1, 3 or 6, characterized in that for reading the time values from the first FIFO buffer, a compare circuit, connected to said buffer and the request circuit, is provided, whose output is connected to the gate circuit.

8. The arrangement according to claim 7, characterized in that the compare circuit is an exclusive-OR circuit.

9. A method of determining the firing times for the print hammers of line printers with a revolving character carrier, wherein the print hammers and the characters have different pitches and the character position on the character carrier is determined by the distance of the characters from a reference mark HPB on the character carrier, and the displacement x of the revolving character carrier relative to a fixed reference point on the printer frame can be determined as the distance of the reference mark HPB on the character carrier from a reference mark HPF on the printer frame, characterized in that for each character in each print position a table entry of the following kind is made in the memory of a computer controlling the character output:

for successive equidistant integral displacement values, whose difference is $>1$, the distances D of the character, which may exist on the character carrier several times, from the reference mark HPB on the character carrier are continuously entered into the table; these entries D are associated with a continuous table index I, and the table is associated with a divisor where said divisor is chosen so that the rounded result of the division of an arbitrary integral displacement value $x-\Delta H$ by the divisor yields a table index $I-K$ for a distance value $D-K$ of the character associated therewith and that for $x<D-K$ the distance value $D-K$ is the desired distance value and for $x>D-K$ the distance value $D-K+1$ is the desired distance value, and that the character is fired after it has travelled this distance relative to the reference mark HPF plus the value $\Delta H$, where $\Delta H$ is the displacement value of a character for a proposed print position relative to the first possible print position which is identical with the reference mark HPF.

10. The method according to claim 9, characterized in that the distance and displacement values are relative time values derivable from the revolving type carrier.

11. The method according to claim 10, characterized in that mechanical or electrical tolerances influencing the firing times of the different print hammers are compensated for by additionally accommodating correction delay values for the print hammers in the table for determining the firing times, thus eliminating adjustments.

* * * * *